United States Patent
Heo et al.

(10) Patent No.: US 9,854,269 B2
(45) Date of Patent: Dec. 26, 2017

(54) METHOD AND APPARATUS FOR PROCESSING MULTIVIEW VIDEO SIGNAL WITH PART OF NON-REFERENCE VIEW

(71) Applicant: LG ELECTRONICS INC., Seoul (KR)

(72) Inventors: Jin Heo, Seoul (KR); Jiwook Jung, Seoul (KR); Sehoon Yea, Seoul (KR); Moonmo Koo, Seoul (KR); Taesup Kim, Seoul (KR); Jaewon Sung, Seoul (KR); Eunyong Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 14/441,142

(22) PCT Filed: Nov. 7, 2013

(86) PCT No.: PCT/KR2013/010065
§ 371 (c)(1),
(2) Date: May 6, 2015

(87) PCT Pub. No.: WO2014/073877
PCT Pub. Date: May 15, 2014

(65) Prior Publication Data
US 2016/0007043 A1    Jan. 7, 2016

Related U.S. Application Data

(60) Provisional application No. 61/723,330, filed on Nov. 7, 2012.

(51) Int. Cl.
*H04N 7/12*        (2006.01)
*H04N 19/597*    (2014.01)
(Continued)

(52) U.S. Cl.
CPC ........... *H04N 19/597* (2014.11); *H04N 13/00* (2013.01); *H04N 13/0048* (2013.01);
(Continued)

(58) Field of Classification Search
CPC .................................................. H04N 19/597
(Continued)

(56) References Cited

U.S. PATENT DOCUMENTS

2011/0216833 A1    9/2011    Chen

FOREIGN PATENT DOCUMENTS

| CN | 102257818 A | 11/2011 |
|----|-------------|---------|
| EP | 2365694 A2  | 9/2011  |

(Continued)

OTHER PUBLICATIONS

XP030130219: Takahashi Y et al: "3D-CE5.h related: MV memory reduction on motion/mode parameter prediction", 2. JCT-3V Meeting; 102. MPEG Meeting; Oct. 13, 2012-Oct. 19, 2012; Shanghai; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-B0038, Oct. 5, 2012 (Oct. 5, 2012).

(Continued)

*Primary Examiner* — Richard Torrente
(74) *Attorney, Agent, or Firm* — Dentons US LLP

(57) ABSTRACT

The method for processing a multiview video signal according to the present invention acquires motion information generated by predictively coding a picture of a reference point, acquires motion information on a part of a block of the picture from among the motion information generated by predictively coding the picture of a non-reference point, and compresses the motion information acquired for every picture of the reference point and non-reference point and stores the compressed motion information.

12 Claims, 10 Drawing Sheets

(51) Int. Cl.
H04N 13/00 (2006.01)
H04N 19/52 (2014.01)
H04N 19/593 (2014.01)

(52) U.S. Cl.
CPC .......... *H04N 19/52* (2014.11); *H04N 19/593* (2014.11); *H04N 2213/003* (2013.01)

(58) Field of Classification Search
USPC .................................................. 375/240.16
See application file for complete search history.

(56) References Cited

FOREIGN PATENT DOCUMENTS

| | | |
|---|---|---|
| JP | 2009543508 A | 12/2009 |
| JP | 2010531622 A | 9/2010 |
| KR | 1020060063614 | 3/2009 |
| KR | 1020100019088 | 2/2010 |
| KR | 101030209 B1 | 4/2011 |
| KR | 1020110102305 | 9/2011 |
| KR | 1020120088611 A | 8/2012 |
| WO | 2008007913 A1 | 1/2008 |
| WO | 2009005626 A2 | 1/2009 |
| WO | 2009005658 | 1/2009 |
| WO | 2010043773 A1 | 4/2010 |
| WO | 2012119777 A1 | 9/2012 |
| WO | 2013-159038 A1 | 10/2013 |

OTHER PUBLICATIONS

XP030130272: Y-W Chen et al: "Motion data buffer reduction for 3D-HEVC", 2. JCT-3V Meeting; 102. MPEG Meeting; Oct. 13, 2012-Oct. 19, 2012; Shanghai; (The Joint Collaborative Team on 3D Video Coding Extension Development of ISO/IEC JTC1/SC29/WG11 and ITU-T SG.16 ); URL: http://phenix.int-evry.fr/jct2/,,No. JCT3V-B0091, Oct. 9, 2012 (Oct. 9, 2012).

XP030130125: Jaewon Sung et al: "3D-CE5.h:Simplitication of disparity vector denvation for HEVC-based 3D video coding",1. JCT-3V Meeting; 101. MPEG Meeting;Jul. 16, 2012- Jul. 20, 2012; Stockholm; (The Joint Collaborative Team on 3D Video Coding Extension Development of ISO/IEC JTC1/SC29/WG11 and ITU-T SG.16 ); URL:http://phenix.int-evry.fr/jct2/,, No. JCT3V-A0126, Jul. 14, 2012 (Jul. 14, 2012).

XP030130183: Gerhard Tech et al: "3D-HEVC Test Model 1", 1. JCT-3V Meeting; 101. MPEG Meeting; Jul. 16, 2012-Jul. 20, 2012; Stockholm; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-A1005, Sep. 20, 2012 (Sep. 20, 2012).

XP030051123: Junghak Nam et al: "Advanced motion and disparity prediction for 3D video coding", 98. MPEG Meeting; Nov. 28, 2011-Dec. 2, 2011; Geneva; (Motion Picture Expert Group or ISO/IEC JTC1/SC29/WG11),, No. m22560, Nov. 23, 2011 (Nov. 23, 2011).

XP030009488: I-K Kim et al: "Experiments on tools in Working Daft (WD) and HEVC Test Mode (HM-3.0)", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16 ); URL: http://wftp3.itu.int/av-arch/jctvc-site/ No. JCTVC-F465, Jul. 1, 2011 (Jul. 1, 2011).

XP030131385: Zhang L et al: "3D-HEVC Test Model 5", 5. JCT-3V Meeting; Jul. 27, 2013-Aug. 2, 2013; Vienna; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-E1005, Sep. 14, 2013 (Sep. 14, 2013).

XP030131201: Y-W Chen (Mediatek) et al: "3D-CE3 related: motion data buffer reduction for 3D-HEVC", 5. JCT-3V Meeting; Jul. 27, 2013-Aug. 2, 2013; Vienna; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-E0170, Jul. 20, 2013 (Jul. 20, 2013).

XP030112985: Joint Collaborative Team on Video Coding, 11th meeting: Shanghai, China, Oct. 10-19, 2012, Description of scalable video coding technology proposal by Qualcomm, Input Document to JCT-VC, JCTVC-K0036.

XP030112968: Joint Collaborative Team on Video Coding, 11th meeting: Shanghai, China, Oct. 10-19, 2012, Description of scalable video coding technology proposal by LG Electronics and MediaTek, Input Document to JCT-VC, JCTVC-K0033.

METHOD AND APPARATUS FOR PROCESSING MULTIVIEW VIDEO SIGNAL WITH PART OF NON-REFERENCE VIEW

This application is a National Stage Application of International Application No. PCT/KR2013/010065, filed Nov. 7, 2013, and claims the benefit of U.S. Provisional Application No. 61/723,330, filed Nov. 7, 2012, all of which are hereby incorporated by reference in their entirety for all purposes as if fully set forth herein.

TECHNICAL FIELD

The present invention relates to a method and apparatus for coding a multiview video signal.

BACKGROUND ART

Compression refers to a signal processing technique for transmitting digital information through a communication line or storing the digital information in a form suitable for a storage medium. Compression targets include audio, video and text information. Particularly, a technique of compressing images is called video compression. Multiview video has characteristics of spatial redundancy, temporal redundancy and inter-view redundancy.

DISCLOSURE

Technical Problem

An object of the present invention is to improve video signal coding efficiency.

Technical Solution

The present invention acquires motion information generated by predictively coding a picture of a reference view and acquires motion information on part of blocks of a picture of a non-reference view from among motion information generated by predictively coding the picture of the non-reference view.

In addition, the present invention compresses acquired motion information using motion vector direction information of the corresponding picture and stores the compressed motion information.

Advantageous Effects

The present invention can reduce the size of a storage and the quantity of data by acquiring compressed motion information of a picture of a non-reference view and improve prediction accuracy by acquiring motion information of a picture of a reference view, used for motion estimation of the picture of the non-reference view, without compressing the motion information of the picture of the reference view.

In addition, the present invention can reduce the size of the storage by variably compressing acquired motion information according to motion vector direction information of the corresponding picture and storing the compressed motion information.

Best Mode

According to an embodiment of the present invention, a method for processing a multiview video signal includes: acquiring motion information generated by predictively coding a picture of a reference view; acquires motion information on part of blocks of a picture of a non-reference view, from among motion information generated by predictively coding the picture of the non-reference view; and compressing the motion information acquired for the picture of the reference view and the motion information acquired for the picture of the non-reference view and storing the compressed motion information.

According to an embodiment of the present invention, an apparatus for processing a multiview video signal includes: a motion information acquisition unit for acquiring motion information generated by predictively coding a picture of a reference view and acquiring motion information on part of blocks of a picture of a non-reference view, from among motion information generated by predictively coding the picture of the non-reference view; and a motion information storage unit for compressing the motion information acquired for the picture of the reference view and the motion information acquired for the picture of the non-reference view and storing the compressed motion information.

Modes for Invention

Techniques for compressing or decoding multiview video signal data consider spatial redundancy, temporal redundancy and inter-view redundancy. In the case of a multiview image, multiview texture images captured at two or more views can be coded in order to generate a three-dimensional image. Furthermore, depth data corresponding to the multiview texture images may be coded as necessary. The depth data can be compressed in consideration of spatial redundancy, temporal redundancy or inter-view redundancy. Depth data is information on the distance between a camera and a corresponding pixel. The depth data can be flexibly interpreted as depth related information such as depth information, a depth image, a depth picture, a depth sequence and a depth bitstream in the specification. In addition, coding can include both the concepts of encoding and decoding in the specification and can be flexibly interpreted within the technical spirit and scope of the present invention.

A texture block of a neighboring view can be specified using an inter-view displacement vector. Here, the inter-view displacement vector may be derived using an inter-view displacement vector of a neighboring block of a current view texture block and using a depth value of the current view texture block.

Figure 1:
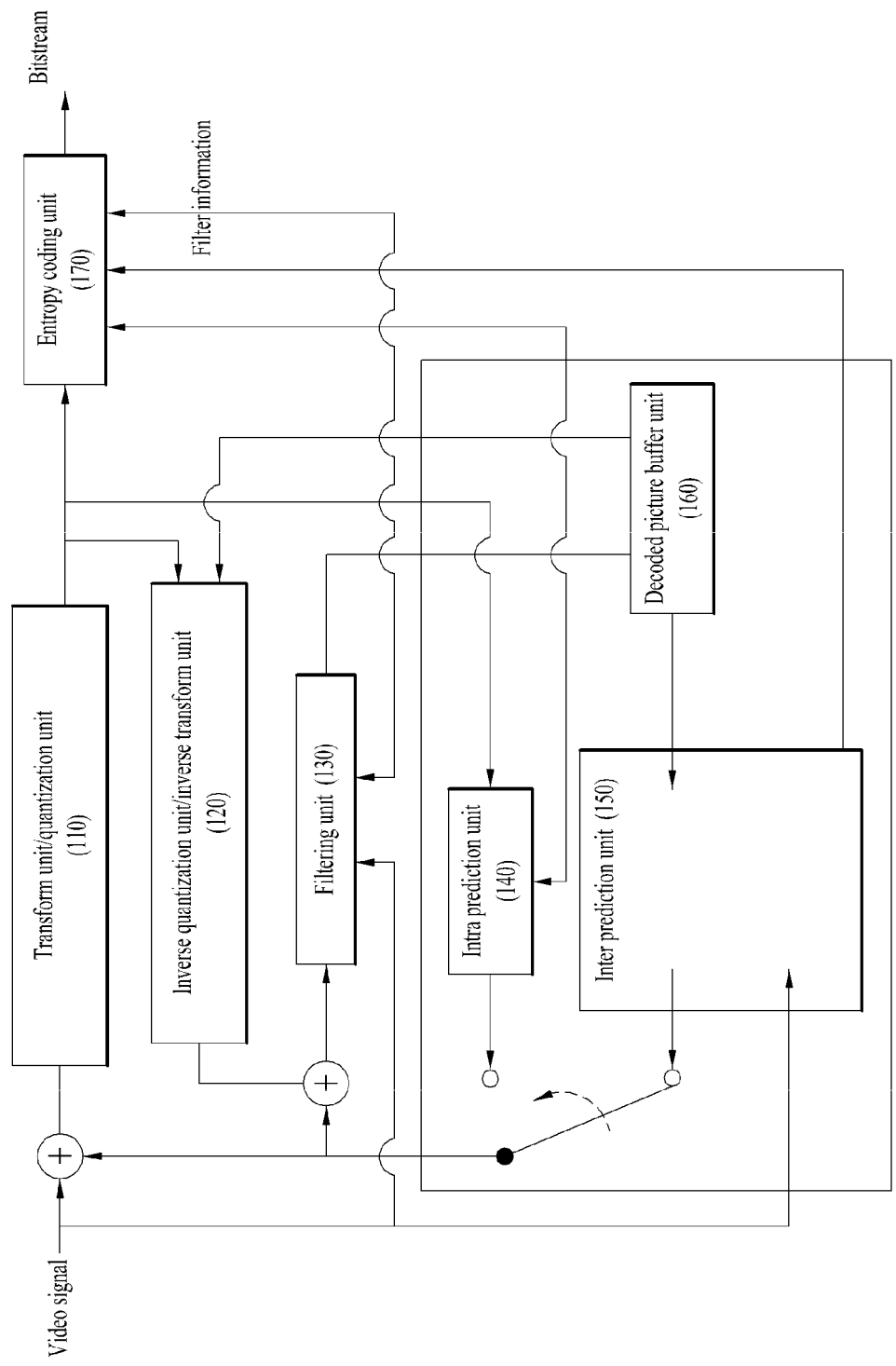
FIG. 1 is a block diagram of a video encoder according to an embodiment of the present invention.

FIG. 1 is a block diagram of a video encoder according to an embodiment of the present invention.

Referring to FIG. 1, the video encoder may include a transform unit/quantization unit 110, an inverse quantization unit/inverse transform unit 120, a filtering unit 130, an intra prediction unit 140, an inter-prediction unit 150, a decoded picture buffer unit 160, and an entropy coding unit 170.

In the transform unit/quantization unit 110, a transform unit transforms texture data with respect to an input video signal to acquire a transform coefficient. Discrete cosine transform (DCT), wavelet transform or the like may be used as a transform method. A quantization unit quantizes the transform coefficient output from the transform unit.

The inverse quantization unit/inverse transform unit 120 applies a quantization parameter to the quantized transform coefficient to acquire a transform coefficient and inversely transforms the transform coefficient to decode texture data. Here, the decoded texture data or depth data may include residual data according to prediction.

The filtering unit 130 performs filtering operation for improvement of quality of the decoded texture data. Filtered texture pictures may be stored in the decoded picture buffer unit 160 to be output or used as reference pictures.

The intra prediction unit 140 may perform intra prediction using decoded texture data in a current view texture picture. Here, coding information used for intra prediction can include an intra prediction mode and partition information of intra prediction.

The inter-prediction unit 150 may perform motion compensation of a current block using reference pictures and motion information stored in the decoded picture buffer unit 160. In the specification, motion information can include a motion vector and reference index information in a broad sense. In addition, the inter-prediction unit 150 can perform temporal inter-prediction for motion compensation. Temporal inter-prediction may refer to inter-prediction using a reference picture, which corresponds to the same view as a current texture block and to a different time from the current texture block, and motion information of the current texture block. In the case of a multiview image captured using a plurality of cameras, inter-view inter-prediction may be performed in addition to temporal inter-prediction. Inter-view inter-prediction may refer to inter-prediction using a reference picture, which corresponds to a different view from the current texture block, and motion information of the current texture block.

The inter-prediction unit 150 may include a motion information acquisition unit and a motion information storage unit to store encoded motion information. Motion information of each view, stored in the motion information storage unit, can be transmitted to a decoder. This will be described in detail with reference to FIG. 2.

The decoded picture buffer unit 160 stores or opens precoded texture pictures in order to perform inter-view prediction. Here, a frame number frame_num and a picture order count (POC which indicates picture output order) of each picture can be used to store each picture in the decoded picture buffer unit 160 or to open each picture.

The entropy coding unit 170 generates a video signal bitstream by entropy-coding the quantized transform coefficient, intra coding information, inter coding information and reference region information input from the inter-prediction unit 150.

A description will be given of compression and storage of motion information in multiview video signal processing.

Figure 2:
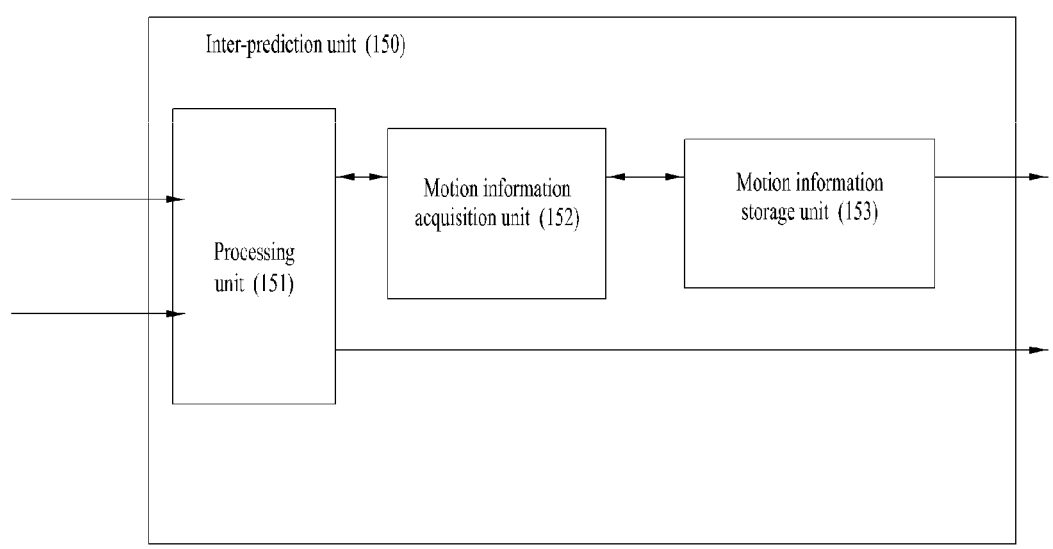
FIG. 2 illustrates a configuration of an inter-prediction unit according to an embodiment of the present invention.

FIG. 2 illustrates a configuration of the inter-prediction unit according to an embodiment of the present invention.

The inter-prediction unit 150 may include a processing unit 151, a motion information acquisition unit 152 and a motion information storage unit 153.

The processing unit 151 can generate motion information for inter-prediction. Specifically, the processing unit 151 can receive a multiview video signal and predictively code pictures in an access unit (AU) to generate motion information for inter-prediction. Here, the access unit is a multiview video signal coding unit and can include texture pictures and depth pictures of views at the same time.

The motion information acquisition unit 152 can temporarily acquire motion information of each view, generated by the processing unit 151, and temporarily store the acquired motion information.

According to an embodiment of the present invention, the motion information acquisition unit 152 may acquire motion information on all blocks included in a picture of a reference view, from among motion information generated by predictively coding the picture of the reference view. In the case of a non-reference view, however, the motion information acquisition unit 152 may acquire only motion information on part of blocks included in a picture of the non-reference view. Here, the reference view refers to a base view or an independent view (V0) used for inter-view inter-prediction and the non-reference view refers to a view other than the reference view.

A detailed motion information acquisition method will be described with reference to FIG. 4.

The motion information storage unit 153 compresses and stores the motion information acquired by the motion information acquisition unit 152. Specifically, the motion information storage unit 153 may compress motion information acquired for a picture of each view at a predetermined rate and store the motion information.

According to an embodiment of the present invention, the motion information storage unit 153 can store motion information on a block having a predetermined size from among motion information acquired from the picture of the reference view and the picture of the non-reference view.

The motion information storage unit 153 can store motion information on a block having a size determined according to motion vector direction information of a picture using the motion vector direction information. Here, motion vector direction information refers to the ratio of a horizontal component of a motion vector to a vertical component thereof.

A detailed description will be given of a method for storing motion information with reference to FIGS. 3 to 7.

FIGS. 3 to 7 illustrate methods for acquiring, compressing and storing motion information according to embodiments of the present invention.

Figure 3:
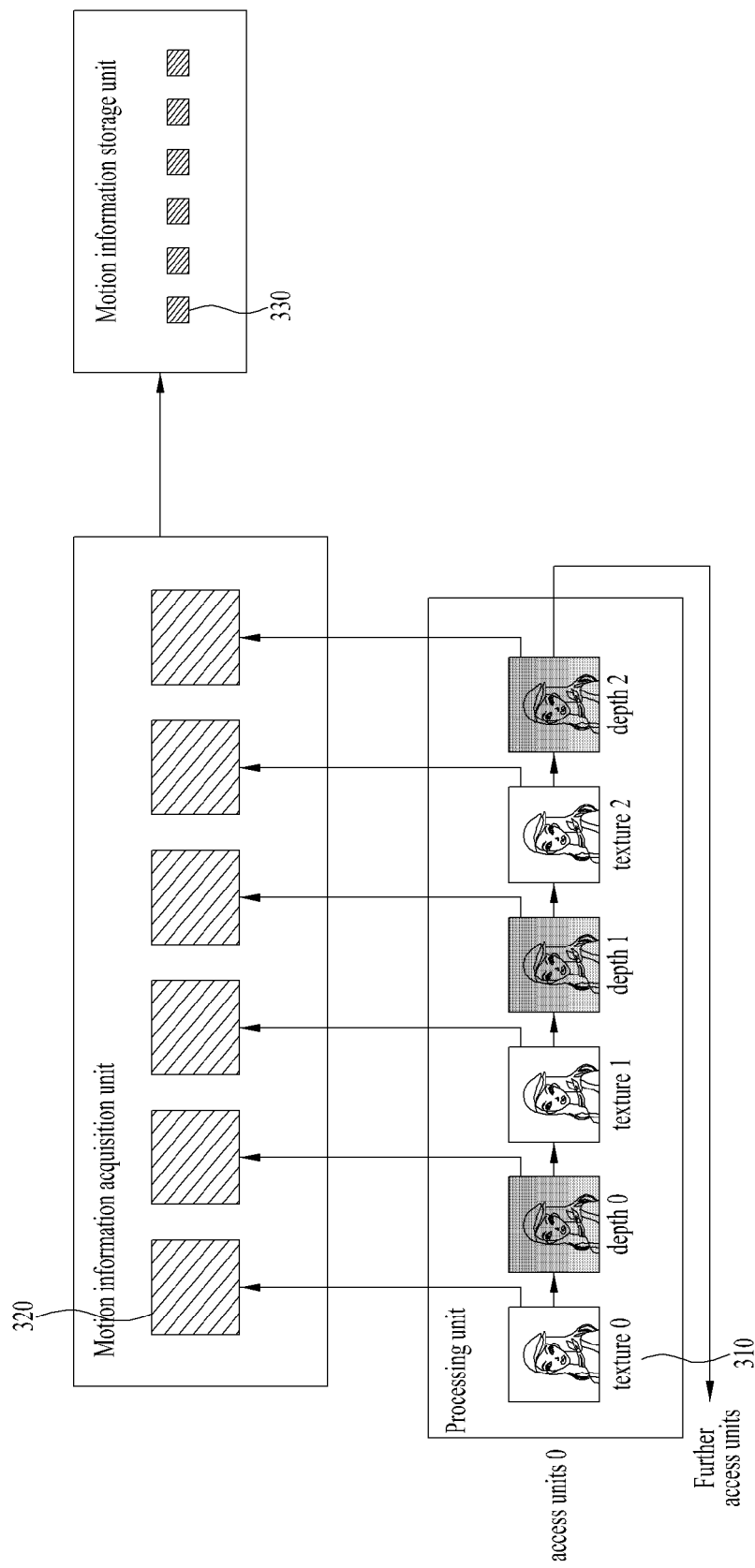
FIGS. 3 to 8 illustrate methods for acquiring, compressing and storing motion information according to embodiments of the present invention.

Referring to FIG. 3, the processing unit can predictively code pictures 310 included in one access unit of a multiview video signal. The processing unit can predictively code pictures (texture 0, depth 0) of a reference view to generate motion information and then predictively code pictures (texture 1, depth 1, texture 2, depth 2) of a non-reference view to generate motion information.

The motion information acquisition unit can acquire the motion information, generated by the processing unit, at full resolution (320). Acquisition of motion information at full resolution means acquisition of motion information on all blocks in a picture. The motion information acquisition unit can acquire motion information in predictive coding order and temporarily store acquired motion information until all pictures of one access unit are predictively coded.

In addition, the motion information storage unit can compress the motion information, acquired by the motion information acquisition unit, per picture and store the compressed motion information (330).

Specifically, the motion information storage unit can store motion information on a block having a predetermined size, from among motion information acquired from the pictures of the reference view and non-reference view.

If one picture consists of 16*16 blocks, the motion information storage unit determines 4*4 blocks having representative motion information for every 16*16 blocks in an embodiment of a 1/16 compression and storage scheme according to the present invention. That is, it is possible to compress motion information by storing motion information on upper left 4*4 blocks, from among 16*16 blocks of one picture, as representative motion information of the current 16*16 blocks, instead of storing motion information on all the blocks (16*16 blocks) of one picture. Alternatively, motion information on upper right 4*4 blocks or lower left 4*4 blocks may be stored as representative motion information.

In the 1/16 compression and storage scheme according to the embodiment of the present invention, the motion information storage unit can store a 1*1 block as representative motion information for every 4*4 blocks that divide 16*16 blocks into 16 equal parts. That is, motion information of the 1*1 block is determined and stored as representative motion information for each of 16 4*4 blocks. Accordingly, 16 pieces of motion information on a 1*1 block are determined as representative motion information per picture.

According to the aforementioned method, the size of the motion information storage unit can be reduced by 1/16 and the decoder can use motion information stored as representative motion information on 16*16 blocks of one picture to perform inter-prediction.

The method of compressing and storing motion information by the motion information storage unit has been described with reference to FIG. 3. A description will be give of a method of acquiring motion information by the motion information acquisition unit with reference to FIG. 4.

Figure 4:
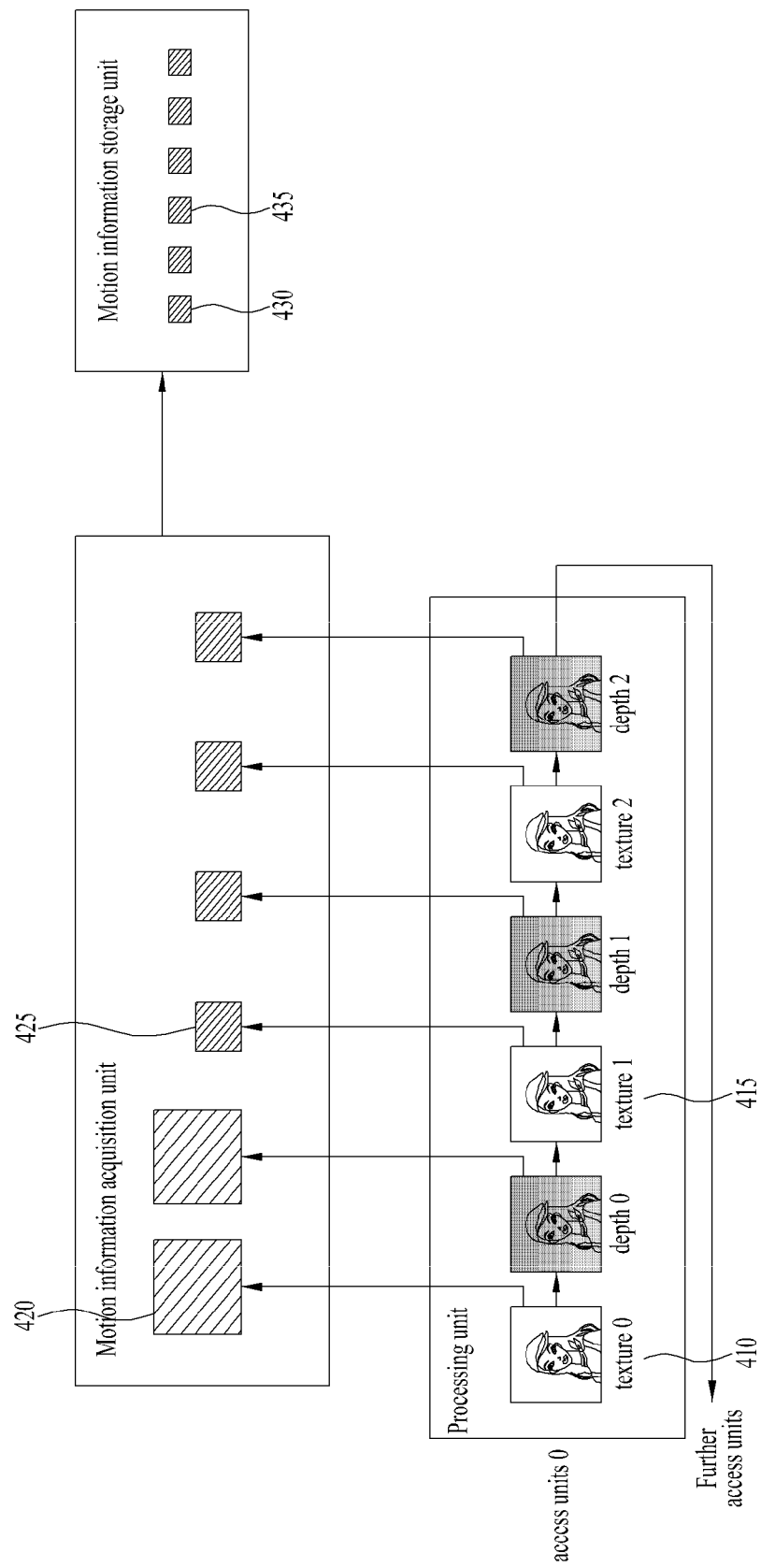

Referring to FIG. 4, the processing unit can sequentially predictively code pictures 410 and 415 included in one access unit of a multiview video signal.

The motion information acquisition unit can acquire motion information generated in the processing unit. The motion information acquisition unit in FIG. 4 can respectively acquire motion information for the reference view picture 410 and the non-reference view picture 415, distinguished from the method shown in FIG. 3. Specifically, for the reference view picture 410, the motion information acquisition unit can acquire motion information on all blocks included in the reference view picture 410 (420) (full resolution). For the non-reference view picture 410, however, the motion information acquisition unit can acquire only motion information on part of blocks included in the non-reference view picture 410. That is, motion information on the reference view is acquired in full resolution (420) and motion information on the non-reference view is acquired in low resolution (425).

For example, when each of the pictures consists of 8M*8M blocks (M being a natural number), the motion information acquisition unit can determine 2M*2M blocks for every 4M*4M blocks in the non-reference view picture and acquire motion information of the determined 2M*2M blocks as representative motion information of the 4M*4M blocks.

When M=2, the motion information acquisition unit can acquire motion information on 4*4 blocks as representative motion information for every 8*8 blocks that divide 16*16 blocks into four equal parts. That is, the motion information acquisition unit determines motion information on 4*4 blocks as representative motion information for every 8*8 blocks. Accordingly, 4 pieces of motion information on 4*4 blocks are determined and acquired as representative motion information per picture. In this case, motion information can be acquired in 1/4 resolution.

When motion information is acquired through the aforementioned method, it is possible to reduce the size of a storage and the quantity of data compared to the method of acquiring full-resolution motion information for all pictures of an access unit. Furthermore, since motion information of a reference view can be used for predictive coding of a non-reference view, predictive coding accuracy can be improved by acquiring full resolution motion information.

The motion information storage unit can compress and store the motion information, acquired by the motion information acquisition unit, per picture.

Specifically, the motion information storage unit can determine blocks having predetermined sizes for a reference view picture and a non-reference view picture and store motion information on the determined blocks having the predetermined sizes, from among motion information acquired by the motion information acquisition unit.

For example, when the reference view picture and non-reference view picture are composed of 8M*8M blocks (M being a natural number), the motion information storage unit can determine 2M*2M blocks for each of the reference view picture and the non-reference view picture and store motion information on the determined 2M*2M blocks, from among motion information acquired per picture by the motion information acquisition unit.

If M=2, the motion information storage unit can select 4*4 blocks from the motion information acquired per picture by the motion information acquisition unit and store the selected 4*4 blocks. That is, the motion information storage unit stores motion information of 4*4 blocks per picture consisting of 16*16 blocks. In this case, motion information can be compressed and stored in 1/16 resolution.

Even in the method of FIG. 4, motion information can be compressed and stored as in the method described with respect to the motion information storage unit of FIG. 3.

Figure 5:
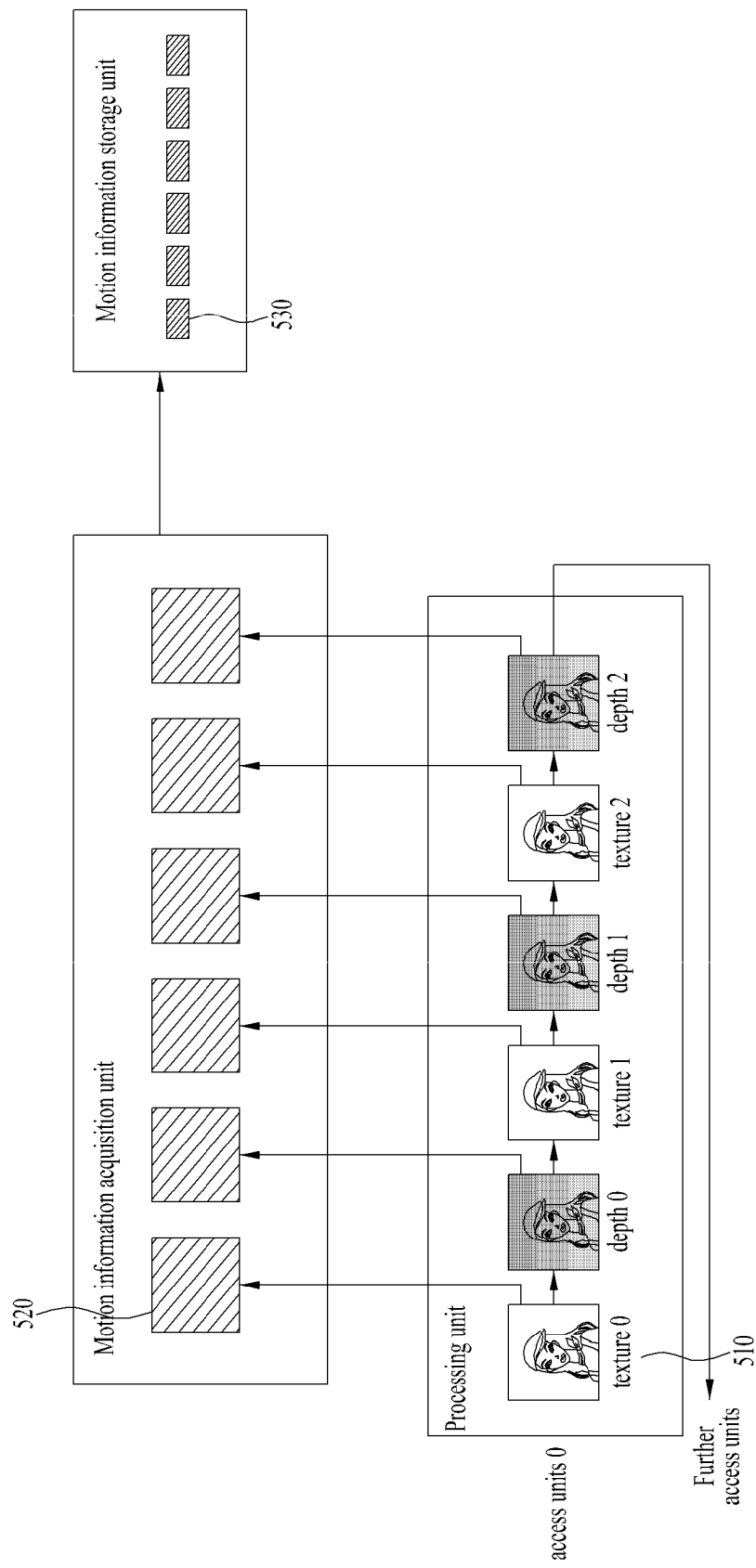
Figure 6:
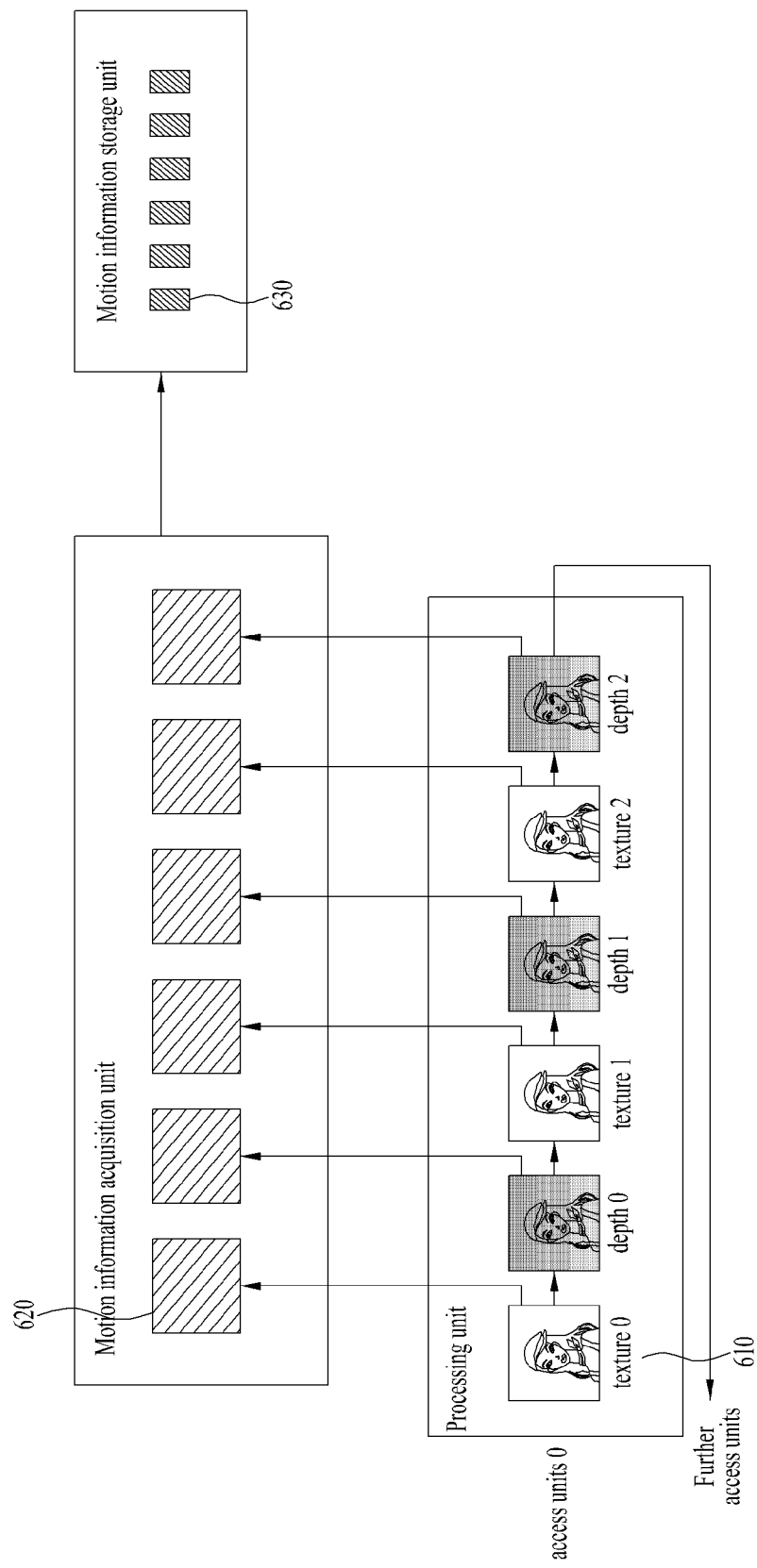
Figure 7:
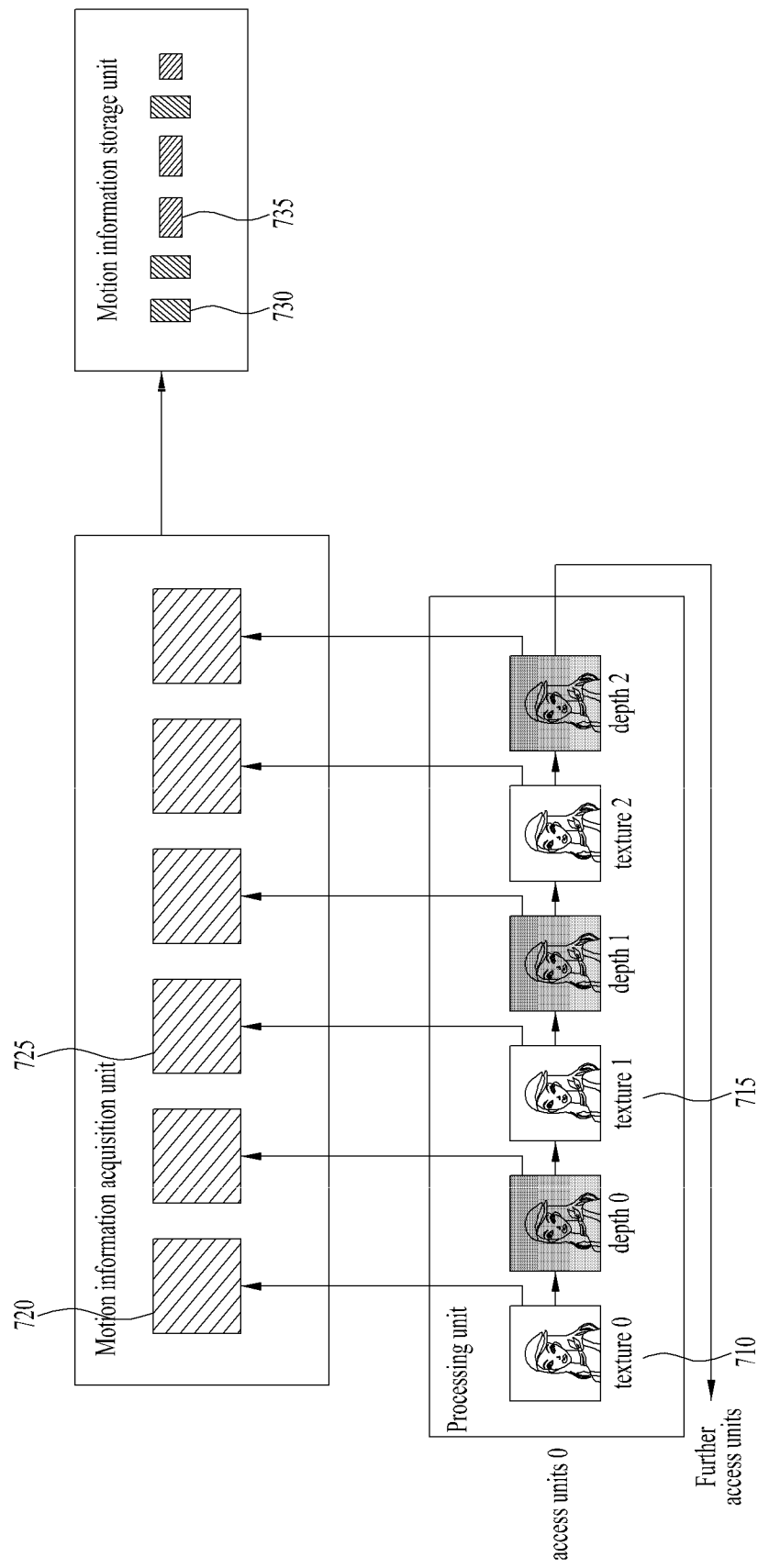

FIGS. 5, 6 and 7 illustrate a method for compressing and storing motion information using motion vector direction information according to an embodiment of the present invention.

The motion vector direction information refers to the ratio of a horizontal component of a motion vector to a vertical component thereof. Motion vector direction information on a non-reference view picture of an access unit (AU) can inherit motion vector direction information on a reference view picture.

Specifically, when a picture has a horizontal motion, motion vector direction information with respect to the picture can indicate that the horizontal component of a motion vector with respect to the picture is larger than the vertical component thereof. When the horizontal component of the motion vector is larger than the vertical component thereof, motion information can be stored in higher horizontal resolution and lower vertical resolution.

That is, P*Q blocks (P and Q being natural numbers) can be determined using motion vector direction information of a picture and motion information on P*Q blocks from among motion information acquired from pictures of a reference view and a non-reference view can be stored.

When the corresponding motion vector direction information indicates that the horizontal component of the corresponding motion vector of the picture is larger than the vertical component thereof, P>Q can be determined. This will be described in detail with reference to FIG. 5.

Conversely, when the motion vector direction information indicates that the vertical component of the motion vector of the picture is larger than the horizontal component thereof, P<Q can be determined. This will be described in detail with reference to FIG. 6.

FIG. 5 illustrates a method for compressing and storing motion information when motion vector direction information indicates that a horizontal component of a motion vector is larger than a vertical component thereof.

Referring to FIG. 5, when the motion vector direction information indicates that the horizontal component of the motion vector is larger than the vertical component thereof, motion information can be stored in higher horizontal resolution and lower vertical resolution in the motion information storage unit.

For example, the motion information storage unit can determine 8*2 blocks from among motion information acquired per picture and store motion information 530 on the determined 8*2 blocks from among motion information 520 acquired per picture by the motion information acquisition unit.

That is, the motion information storage unit stores motion information on 8*2 blocks per picture consisting of 16*16 blocks. In this case, the motion information can be compressed and stored in 1/16 resolution.

FIG. 6 illustrates a method for compressing and storing motion information when motion vector direction information indicates that a vertical component of a motion vector is larger than a horizontal component thereof.

Referring to FIG. 6, when the motion vector direction information indicates that the vertical component of the motion vector is larger than the horizontal component thereof, motion information can be stored in higher vertical resolution and lower horizontal resolution.

For example, the motion information storage unit can determine 2*8 blocks from among motion information acquired per picture and store motion information 630 on the determined 2*8 blocks from among motion information 620 acquired per picture by the motion information acquisition unit.

That is, the motion information storage unit stores information on 2*8 blocks per picture consisting of 16*16 blocks. In this case, the motion information can be compressed and stored in 1/16 resolution.

In FIGS. 5 and 6, motion vector direction information about non-reference view pictures of the access units succeed to motion vector direction information about reference view pictures, and the motion vector direction information about the access unit of FIG. 5 is the same as the motion vector direction information about the access unit of FIG. 6.

FIG. 7 illustrates a method for compressing and storing motion information when pictures of views, included in an access unit, have different motion vector direction information.

Referring to FIG. 7, the motion information storage unit can set resolution of motion information, stored therein, per picture using motion vector direction information of each picture.

When motion vector direction information of a picture (texture 0) of the reference view indicates that the vertical component of a motion vector with respect to the picture is larger than the horizontal component thereof, the motion information storage unit can store motion information about the reference view picture in higher horizontal resolution.

When motion vector direction information of a picture (texture 1) of the non-reference view indicates that the horizontal component of a motion vector with respect to the picture is larger than the vertical component thereof, the motion information storage unit can store motion information about the non-reference view picture in higher vertical resolution.

For example, 8*2 blocks, from among motion information acquired from the reference view picture (texture 0), can be determined and motion information 730 on the determined 8*2 blocks, from among motion information 720 acquired from the reference view picture by the motion information acquisition unit, can be stored.

In addition, 2*8 blocks from among motion information acquired from the non-reference view picture (texture 1) can be determined and motion information 735 on the determined 2*8 blocks, from among motion information 725 acquired from the non-reference view picture by the motion information acquisition unit, can be stored.

Figure 8:
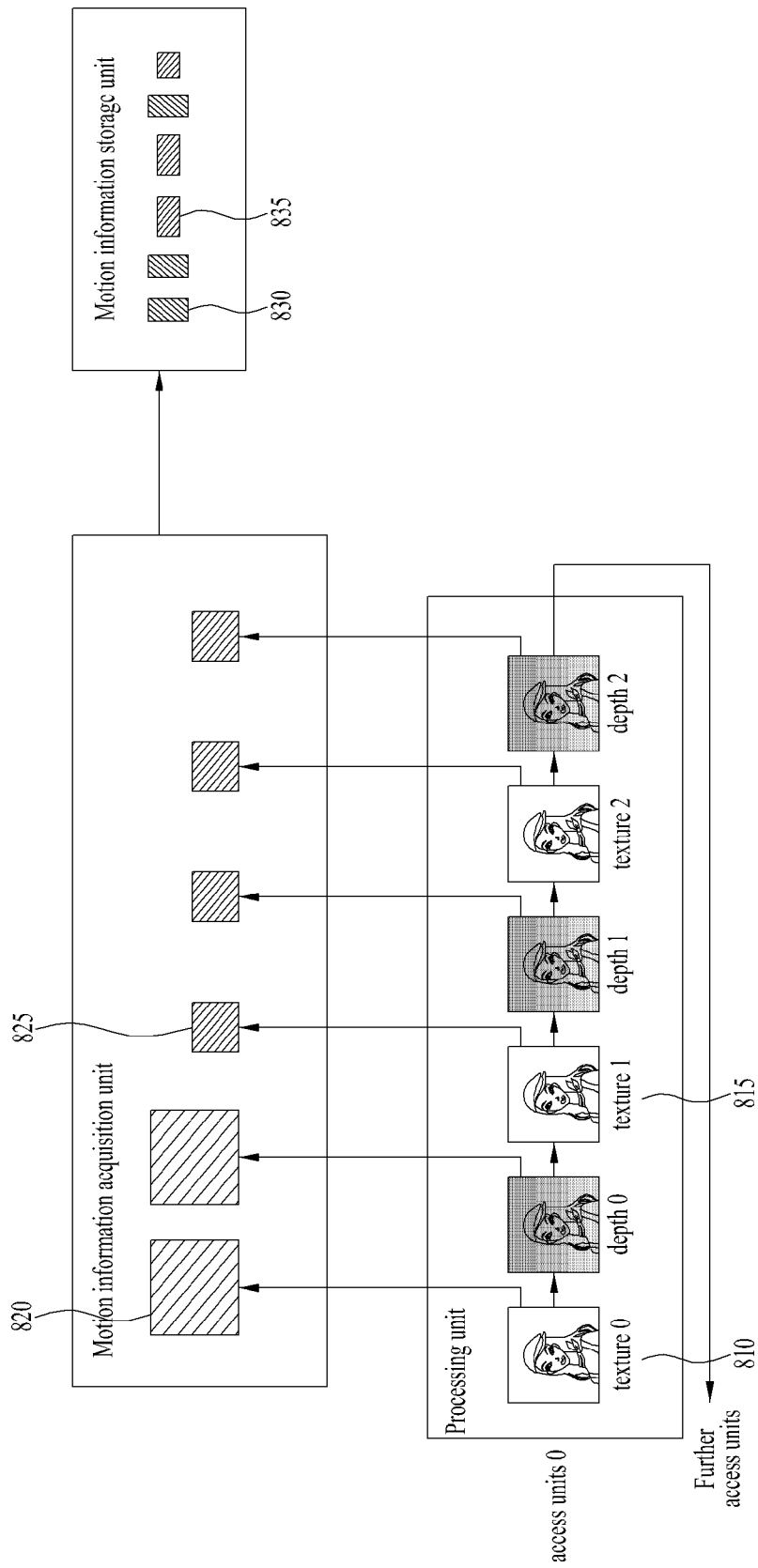

FIG. 8 illustrates an embodiment to which the method for acquiring motion information, described with respect to FIG. 4, and the method for compressing and storing motion information using motion vector direction information per picture, described with respect to FIG. 7, are simultaneously applied.

Referring to FIG. 8, the processing unit can sequentially predictively code pictures 810 and 815 included in one access unit of a multiview video signal.

The motion information acquisition unit can acquire motion information generated in the processing unit. The motion information acquisition unit can respectively acquire motion information for the picture 810 of a reference view and the picture 815 of a non-reference view. The method for acquiring the motion information has been described with reference to FIG. 4 and thus detailed description thereof is omitted.

The motion information storage unit can compress the motion information, acquired by the motion information acquisition unit, per picture and store the motion information. Particularly, the motion information storage unit of FIG. 8 can determine motion vector direction information per picture and allocate resolution of motion information, which will be stored by the motion information storage unit, per picture.

The method for compressing and storing motion information has been described with reference to FIG. 7 and thus detailed description thereof is omitted.

Figure 9:
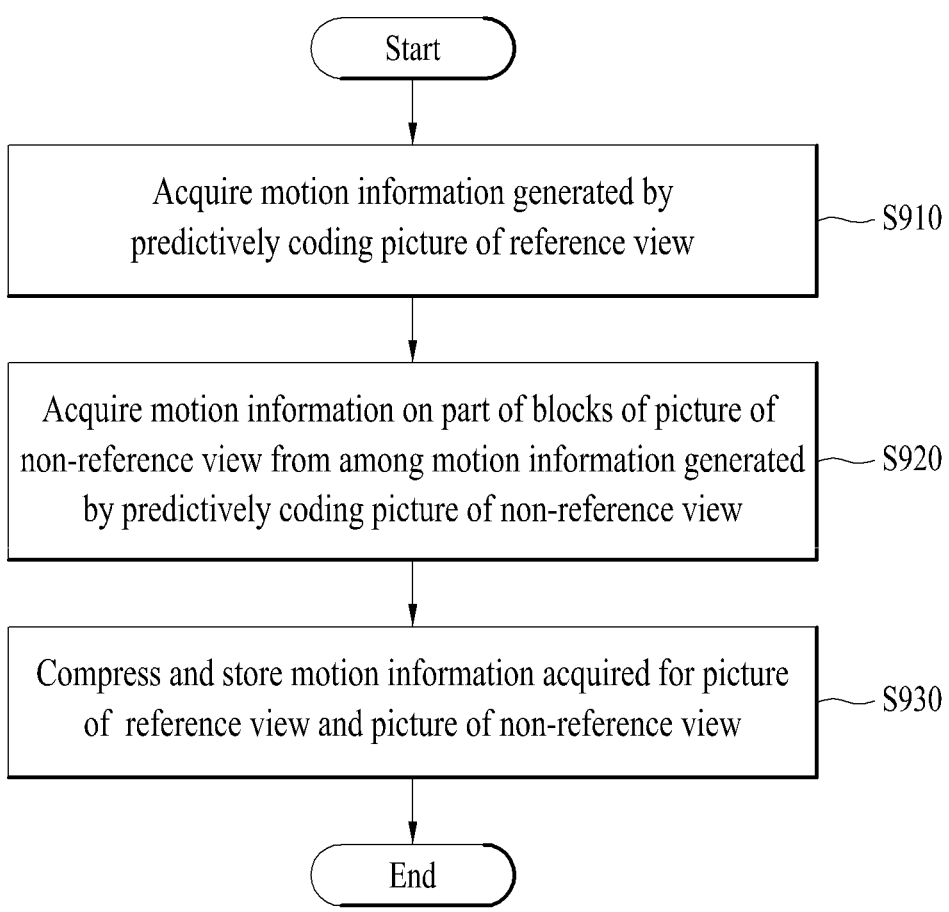
FIG. 9 is a flowchart illustrating a method for acquiring and storing motion information according to an embodiment of the present invention.

FIG. 9 is a flowchart illustrating a method for acquiring and storing motion information according to an embodiment of the present invention.

Referring to FIG. 9, an encoder according to an embodiment of the present invention may acquire motion information generated by predictively encoding a picture of a reference view (S910). In addition, the encoder may acquire motion information regarding part of blocks of a picture of a non-reference view, from among motion information generated by predictively encoding the picture of the non-reference view (S920).

Here, if each picture is composed of 8M*8M blocks (M being a natural number), 2M*2M blocks can be determined for every 4M*4M blocks in the picture of the non-reference view and motion information on the determined 2M*2M blocks can be acquired as representative motion information on the 4M*4M blocks, thereby acquiring the motion information with respect to part of the blocks of the picture of the non-reference view.

In one embodiment, the 2M*2M blocks can be determined by selecting upper left 2M*2M blocks in the 4M*4M blocks.

A decoder can compress the motion information acquired for each picture of the reference view and each picture of the non-reference view and store the motion information (S930). Here, the motion information can be compressed and stored through the aforementioned method of determining 2M*2M blocks for each of pictures of the reference view and non-reference view and storing motion information on the determined 2M*2M blocks from among the acquired motion information.

Figure 10:
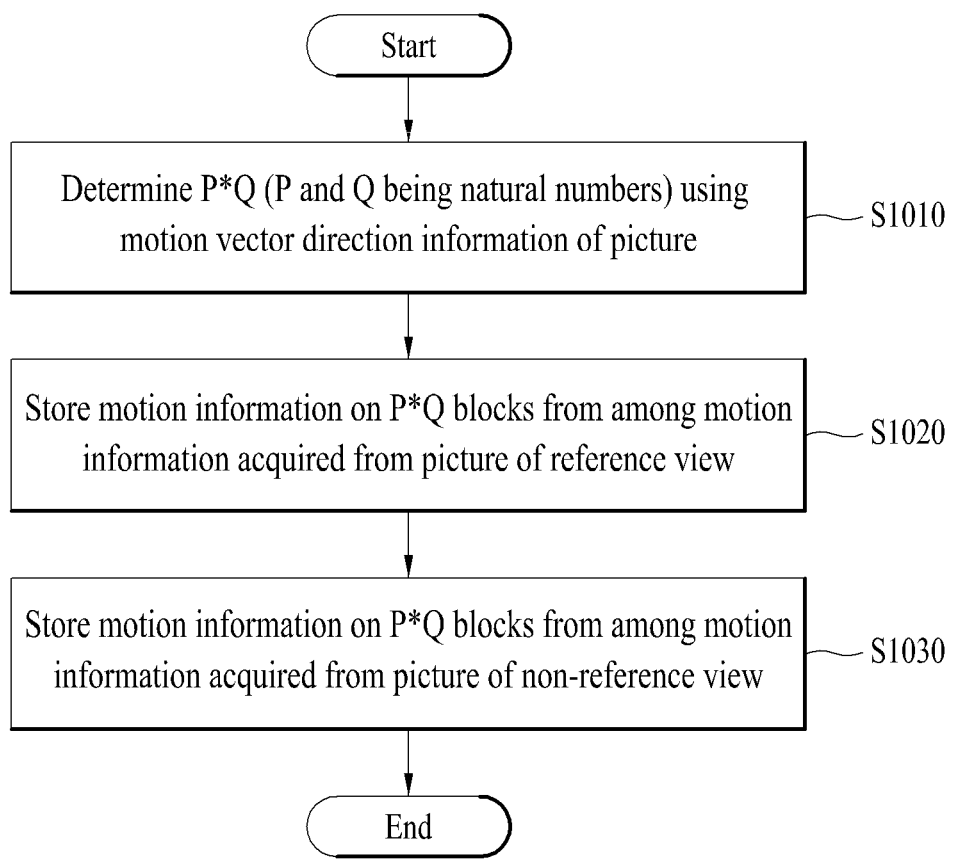
FIG. 10 is a flowchart illustrating a method for compressing and storing acquired motion information according to an embodiment of the present invention.

FIG. 10 is a flowchart illustrating a method for compressing and storing acquired motion information according to an embodiment of the present invention.

Referring to FIG. 10, the decoder can determine P*Q using motion vector direction information of a picture (S1010) (P and Q being natural numbers). A method for determining P*Q has been described with reference to FIGS. 5, 6 and 7 and thus detailed description thereof is omitted.

Motion information on P*Q blocks, from among motion information acquired from a picture of a reference view, can be stored (1020), and motion information on the P*Q blocks, from among motion information acquired from a picture of a non-reference view, can be stored (1030).

The methods for processing multiview video signals of the present invention, as illustrated in FIGS. 9 and 10, can reduce the size of a storage and the quantity of data information by compressing motion information of non-reference view pictures and improve prediction accuracy by acquiring motion information of the reference view pictures, used for motion estimation of the non-reference view pictures, without compressing the motion information of the reference view pictures.

Furthermore, acquired motion information can be variably compressed and stored according to motion vector direction information of pictures so as to reduce the size of the storage.

As described above, the decoding/encoding apparatus to which the present invention is applied may be included in a multimedia broadcast transmission/reception apparatus such as a DMB (digital multimedia broadcast) system to be used to decode video signals, data signals and the like. In addition, the multimedia broadcast transmission/reception apparatus may include a mobile communication terminal.

The decoding/encoding method to which the present invention is applied may be implemented as a computer-executable program and stored in a computer-readable recording medium and multimedia data having a data structure according to the present invention may also be stored in a computer-readable recording medium. The computer-readable recording medium includes all kinds of storage devices storing data readable by a computer system. Examples of the computer-readable recording medium include a ROM, a RAM, a CD-ROM, a magnetic tape, a floppy disk, an optical data storage device, and a medium using a carrier wave (e.g. transmission through the Internet). In addition, a bitstream generated according to the encoding method may be stored in a computer-readable recording medium or transmitted using a wired/wireless communication network.

INDUSTRIAL APPLICABILITY

The present invention can be used to code a video signal.
The invention claimed is:

1. A method for processing a multiview video signal, comprising:

acquiring reference view motion information of all blocks included in a reference view picture, wherein the reference view picture is included in a reference view;

acquiring non-reference view motion information on part of blocks included in a non-reference view picture, wherein the non-reference view picture is included in a non-reference view and the non-reference view picture is coded using the information of reference view; and compressing the reference view motion information and the non-reference view motion information by predetermined resolution; and storing the compressed reference view motion information and the compressed non-reference view motion information in a decoded picture buffer unit, wherein a number of the all blocks from which the reference view motion information is acquired is larger than a number of the part of blocks from which the non-reference view motion information is acquired, wherein each of the reference view picture and the non-reference picture is composed of 8M*8M blocks (M being a natural number), wherein the number of the reference view motion information is 8M*8M, wherein the acquiring the non-reference view motion information on part of blocks of the non-reference view picture comprises:

determining 2M*2M blocks for each 4M*4M block in the picture of the non-reference view; and acquiring the non-reference view motion information on the determined 2M*2M blocks as representative motion information of the 4M*4M blocks, wherein the decoded picture buffer allocates a size of the decoded picture buffer in which the compressed reference view motion information is stored to be larger than a size of the decoded picture buffer in which the compressed non-reference view motion information is stored.

2. The method according to claim 1, wherein the determining of the 2M*2M blocks comprises selecting upper left 2M*2M blocks in the 4M*4M blocks.

3. The method according to claim 1, wherein the compressing and storing of the motion information comprises:

determining 2M*2M blocks for each of the picture of the reference view and the picture of the non-reference view; and storing motion information on the determined 2M*2M blocks from among the acquired motion information.

4. The method according to claim 1, wherein the compressing and storing of the motion information comprises:

determining P*Q (P and Q being natural numbers) using motion vector direction information of the pictures;

storing motion information on P*Q blocks from among the motion information acquired from the picture of the reference view; and storing motion information on P*Q blocks from among the motion information acquired from the picture of the non-reference view, wherein the motion vector direction information is the ratio of a horizontal component of a motion vector to a vertical component thereof.

5. The method according to claim 1, wherein the motion information includes a motion vector and reference index information.

6. The methods according to claim 1, wherein the predetermined resolution of the compressed reference view motion information is different from the predetermined resolution of the compressed non-reference view motion information.

7. An apparatus for processing a multiview video signal, comprising:
a processor; and
a motion information acquisition unit included in an inter prediction unit that;
acquires reference view motion information all blocks included in a reference view picture, wherein the reference view picture is included in a reference view; and
acquires non-reference view motion information on part of blocks included in a non-reference view picture, wherein the non-reference view picture is included in a non-reference view and the non-reference view picture is coded using the information of reference view; and
a motion information storage unit included in the inter prediction unit that:
compresses the reference view motion information and the non-reference view motion information; and
stores the compressed reference view motion information, wherein the non-reference view picture is included in a non-reference view motion information and the compressed non-reference view motion information in a decoded picture buffer unit,
wherein a number of the all blocks from which the reference view motion information is acquired is larger than a number of the part of blocks from which the non-reference view motion information is acquired,
wherein each of the reference view picture and the non-reference pictures is composed of 8M*8M blocks (M being a natural number),
wherein the number of the reference view motion information is 8M*8M,
wherein motion information acquisition unit determines 2M*2M blocks for each 4M*4M block in the non-reference picture and acquires the non-reference view motion information on the determined 2M*2M blocks as representative motion information of the 4M*4M blocks,
wherein the decoded picture buffer allocates a size of the decoded picture buffer in which the compressed reference view motion information is stored to be larger than a size of the decoded picture buffer in which the compressed non-reference view motion information is stored.

8. The apparatus according to claim 7, wherein the motion information acquisition unit selects upper left 2M*2M blocks in the 4M*4M blocks.

9. The apparatus according to claim 7, wherein the motion information storage unit determines 2M*2M blocks for each of the picture of the reference view and the picture of the non-reference view and stores motion information on the determined 2M*2M blocks from among the acquired motion information.

10. The apparatus according to claim 7, wherein the motion information storage unit determines P*Q (P and Q being natural numbers) using motion vector direction information of the pictures, stores motion information on P*Q blocks from among the motion information acquired from the picture of the reference view and stores motion information on P*Q blocks from among the motion information acquired from the picture of the non-reference view,
wherein the motion vector direction information is the ratio of a horizontal component of a motion vector to a vertical component thereof.

11. The apparatus according to claim 7, wherein the motion information includes a motion vector and reference index information.

12. The apparatus according to claim 7, wherein the predetermined resolution of the compressed reference view motion information is different from the predetermined resolution of the compressed non-reference view motion information.

* * * * *